United States Patent
Wilensky

(10) Patent No.: US 10,915,571 B2
(45) Date of Patent: Feb. 9, 2021

(54) REDUCTION OF SEARCH AMBIGUITY WITH MULTIPLE MEDIA REFERENCES

(71) Applicant: ADOBE INC., San Jose, CA (US)

(72) Inventor: Gregg D. Wilensky, Pacific Palisades, CA (US)

(73) Assignee: ADOBE INC., San Jose, CA (US)

( * ) Notice: Subject to any disclaimer, the term of this patent is extended or adjusted under 35 U.S.C. 154(b) by 632 days.

(21) Appl. No.: 15/595,378

(22) Filed: May 15, 2017

(65) Prior Publication Data

US 2017/0249338 A1 Aug. 31, 2017

Related U.S. Application Data

(62) Division of application No. 10/526,287, filed as application No. PCT/US02/31258 on Sep. 30, 2002, now Pat. No. 9,684,675.

(51) Int. Cl.
*G06F 16/00* (2019.01)
*G06F 16/583* (2019.01)
*G06F 16/48* (2019.01)
*G06F 16/56* (2019.01)
*G06F 16/332* (2019.01)
(Continued)

(52) U.S. Cl.
CPC ........ *G06F 16/583* (2019.01); *G06F 16/3322* (2019.01); *G06F 16/48* (2019.01); *G06F 16/532* (2019.01); *G06F 16/56* (2019.01); *G06K 9/4652* (2013.01); *G06K 9/6271* (2013.01); *G06T 7/40* (2013.01)

(58) Field of Classification Search
CPC .............................. G06F 16/70; G06F 16/583

USPC ........................................ 707/914, 758, 736
See application file for complete search history.

(56) References Cited

U.S. PATENT DOCUMENTS 5,245,671 A 9/1993 Kobayashi et al.
5,499,306 A 3/1996 Sasaki et al.
(Continued)

FOREIGN PATENT DOCUMENTS

DE 10297802 B4 5/2011
GB 2407675 B 1/2006
(Continued)

OTHER PUBLICATIONS

Essam El-Kwae et al. "A Robust Framework for Content-Based Retrieval by Spatial Similarity in Image Databases," ACM, Apr. 1999, pp. 175-198.
(Continued)

*Primary Examiner* — Alexandria Y Bromell
(74) *Attorney, Agent, or Firm* — Shook, Hardy & Bacon L.L.P.

(57) ABSTRACT

Methods and apparatus for implementing a technique for searching media objects. In general, in one aspect, the technique includes receiving user input specifying a plurality of reference objects, defining a set of features for them, and combining the features to generate composite reference information defining criteria for search. In general, in another aspect, the technique includes combining object information for a plurality of reference objects to produce composite reference information, comparing the composite reference information to object information for media objects in a collection of media objects, and selecting a media object based upon the comparison.

20 Claims, 9 Drawing Sheets

(51) Int. Cl.
*G06F 16/532* (2019.01)
*G06K 9/46* (2006.01)
*G06K 9/62* (2006.01)
*G06T 7/40* (2017.01)

(56) References Cited

U.S. PATENT DOCUMENTS

| | | | |
|---|---|---|---|
| 5,579,471 | A | 11/1996 | Barber et al. |
| 5,751,286 | A | 5/1998 | Barber et al. |
| 5,835,667 | A * | 11/1998 | Wactlar ............... G11B 27/034 |
| | | | 386/241 |
| 5,911,139 | A | 6/1999 | Jain et al. |
| 5,915,250 | A | 6/1999 | Jain et al. |
| 5,983,237 | A | 11/1999 | Jain et al. |
| 6,014,461 | A | 1/2000 | Hennessey et al. |
| 6,035,055 | A | 3/2000 | Wang et al. |
| 6,094,501 | A | 7/2000 | Beatty et al. |
| 6,175,829 | B1 | 1/2001 | Li et al. |
| 6,192,150 | B1 | 2/2001 | Leow et al. |
| 6,219,129 | B1 | 4/2001 | Kinjo et al. |
| 6,243,143 | B1 * | 6/2001 | Hatalsky ............... H04N 5/265 |
| | | | 348/584 |
| 6,347,313 | B1 | 2/2002 | Ma et al. |
| 6,366,296 | B1 | 4/2002 | Boreczky et al. |
| 6,445,822 | B1 | 9/2002 | Crill et al. |
| 6,567,128 | B1 * | 5/2003 | Webb ............... H04N 19/176 |
| | | | 348/584 |
| 6,631,210 | B1 | 10/2003 | Mutoh et al. |
| 6,720,971 | B1 | 4/2004 | Yamamoto et al. |
| 6,751,363 | B1 | 6/2004 | Natsev et al. |
| 6,757,333 | B2 * | 6/2004 | Saunders ............ H04N 19/176 |
| | | | 375/240.26 |
| 7,031,554 | B2 | 4/2006 | Iwane |
| 7,058,220 | B2 | 6/2006 | Obrador |
| 7,126,612 | B2 | 10/2006 | Sekiguchi et al. |
| 7,231,381 | B2 | 6/2007 | Li et al. |
| 7,337,065 | B2 | 2/2008 | Adler-Golden et al. |
| 7,346,631 | B2 | 3/2008 | Amirghodsi |
| 7,421,119 | B2 | 9/2008 | Matsushiro et al. |
| 2002/0002550 | A1 | 1/2002 | Berman |
| 2002/0044691 | A1 | 4/2002 | Matsugu |
| 2002/0159630 | A1 | 10/2002 | Buzuloiu et al. |
| 2002/0180734 | A1 | 12/2002 | Endoh et al. |
| 2002/0191021 | A1 | 12/2002 | Labelle |
| 2003/0120673 | A1 * | 6/2003 | Ashby ............... G06F 16/58 |
| | | | 707/707 |
| 2004/0236791 | A1 | 11/2004 | Kinjo |
| 2005/0206643 | A1 | 9/2005 | Endoh et al. |
| 2007/0005795 | A1 * | 1/2007 | Gonzalez ............ H04N 19/186 |
| | | | 709/232 |

FOREIGN PATENT DOCUMENTS

| | | |
|---|---|---|
| JP | 4523413 B2 | 8/2010 |
| WO | 2004/031991 A1 | 4/2004 |

OTHER PUBLICATIONS

Ishikawa, et al., "Implementation and Evaluation of an Image Retrieval System Incorporating Example-based Feedback", Technical Report of IBICE, May 2000, vol. 100, No. 31, pp. 25-32.

Stan, Daniela. "Image Retrieval Using a Hierarchy of Clusters," Mar. 2001, ACM, vol. 2013, pp. 377-386.

Kresimir Matkovic et al. "Visual Image Query," ACM, Jun. 11-13, 2002, pp. 116-123.

Totaro, et al., "Content-based Image Retrieval with the Capability of Automatic Setting of Similarity Measure", Society of Information Processing, Sep. 2002, vol. 2002, No. 13, pp. 89-94.

International Preliminary Examination Report dated Mar. 19, 2004 in International Patent Application No. PCT/US02/31258, published Apr. 15, 2004. 18 pages.

\* cited by examiner

REDUCTION OF SEARCH AMBIGUITY WITH MULTIPLE MEDIA REFERENCES

CROSS REFERENCE TO RELATED APPLICATIONS

This application is a divisional of U.S. patent application Ser. No. 10/526,287, filed Mar. 1, 2005, which is the National Stage of International Application No. PCT/US2002/031258, filed Sep. 30, 2002, each of which is hereby incorporated by reference in its entirety.

BACKGROUND OF THE INVENTION

The present invention relates to searching media objects.

Electronic technologies for capturing, storing, and relaying digital objects such as images, audio files, and videos are now readily available. Moreover, the increasingly common use of these technologies has resulted in large numbers of readily obtainable media objects. People make pictures using digital cameras, drawing programs, and photo-management software. They create video files with handheld video cams and burn CDs on home entertainment centers. The resulting digital objects are easily copied and stored, and can easily accumulate in an archive. They are also easily shared on the World Wide Web, or Internet—for example, by email or on a website—making large numbers of media objects available to many people.

As the number and accessibility of media objects increases, it can become increasingly difficult to manage them. For example, the larger a set of images becomes, the more difficult it can be to find a particular or desirable picture. A person may, for example, attempt to find a particular image by recalling the time it was created or the directory where it was stored. Similarly, the greater the access to audio and video files, the more difficult it can be to find a particular or desirable song or movie. A person may, for example, attempt to find a particular audio or video recording by recalling its title, or the name of its lead performer or actor. Using such information about the media objects to define the search intent can be problematic, since it may require a person to remember details about a particular object in order to find it.

A person can search a collection of media objects for particular features or aspects that are inherent to the object— not just associated with it. For example, a person can search for images that have a particular distribution of colors, shapes, and textures by specifying parameters describing these features. A person can attempt to search for images that include, for example, a specific object or person by providing a reference image and searching for images that are similar to it. Existing image search engines compare a selected reference image to images in a database, and rank those images as more or less similar to the reference. The process can be repeated, for example, using different references to search smaller subsets of the database.

Information about a media object and information from a reference object provide useful bases to search a database. However, they impose limits on the criteria that can be used for a search, and often do not adequately characterize the searcher's intent.

SUMMARY OF THE INVENTION

The invention provides techniques for specifying search criteria by combining reference features to reduce ambiguity in defining search intent. In general, in one aspect, the invention provides methods and computer program products implementing techniques for combining object information for a plurality of reference objects to produce composite reference information representing criteria for a search. The composite reference information is compared to object information for media objects in a collection of media objects to identify one or more media objects in the collection of media objects.

Advantageous implementations of the methods and computer program products can include one or more of the following features. A media object in the collection of media objects can be selected based upon the comparison of the object information and the composite reference information. The plurality of reference objects can be specified by user input. The plurality of reference objects can include one or more objects having a type selected from: audio, image, text, CD, video. Object information for different types of objects can be combined. Combining object information can include determining the intersection or the union of the object information for the reference objects.

The object information can characterize features of the reference objects and the media objects in the collection of media objects. The features can be weighted to specify a relative importance of the features. Weighting the features can include receiving user input indicating the relative importance of the features. A feature can be represented by the relative frequency of occurrence of each of several values for the feature. The set of features can include color information describing the relative frequency of occurrence of colors in an object. A feature for a first object type can be mapped to a feature for a second object type.

The techniques can include combining object information for an additional reference object with the composite reference information to revise the composite reference information. The additional reference can be a media object identified by comparing the composite reference information to object information for media objects. The revised composite reference information can be compared to object information for media objects in the collection of media objects.

A similarity value, indicating the similarity of the object to the composite reference information, can be assigned to each of the media objects in the collection of media objects. The similarity value of each of the media objects in the collection of media objects can be less than or equal to a similarity value calculated for each reference object. The media objects can be ranked according to their similarity values, and a media object can be selected based upon its rank.

The object information for each of the reference and media objects can be expressed as a feature vector of components, where each feature vector includes one or more components representing a feature of the corresponding reference or media object. Each feature vector can include one or more components representing metadata associated with the corresponding reference or media object. The feature vectors of the plurality of reference objects can be combined to produce a composite reference vector. Components representing a feature of part or all of each reference object can be combined according to a first combination function, and components representing metadata associated with part or all of each reference object can be combined according to a second combination function.

A weighting vector that specifies the relative importance of one or more features can be defined and used in combining the feature vectors. A Min or Max function can be used to combine feature vectors. The composite reference vector can be compared to the feature vectors of each of the plurality of media objects in the collection of media objects. The composite reference vector can be compared to the feature vectors of each of the media objects using a Min or Max function. Object information for reference objects can be combined using a combination function, and the composite reference information can be compared to object information for media objects using a comparison function that is based upon the combination function.

In one implementation, the object information can characterize features of the reference objects and the media objects in the collection of media objects and be expressed as a feature vector of components; the feature vectors of the plurality of reference objects can be combined using a Min or Max function to produce a composite reference vector, and the composite reference vector can be compared to the feature vectors of each media object in the collection of media objects using a Min or Max function; and a similarity value that indicates the similarity of the feature vector of the media object to the composite reference vector can be assigned to each media object in the collection of media objects, where the similarity value of each of the media objects in the collection of media objects is less than or equal to a similarity value calculated for each reference object.

In general, in another aspect, the invention provides a system for searching a collection of media objects. The system includes a means for combining object information for a plurality of reference objects to produce composite reference information representing criteria for a search, and a means for comparing the composite reference information to object information for media objects in a collection of media objects to identify one or more media objects in the collection of media objects.

Advantageous implementations of the system for searching a collection of media objects can include one or more of the following features. The system can include a means for assigning a similarity value, indicating the similarity of the object to the composite reference information, to each of the media objects in the collection of media objects, wherein the similarity value of each of the media objects in the collection of media objects is less than or equal to a similarity value calculated for each reference object.

The object information can characterize features of the reference objects and the media objects in the collection of media objects and can be expressed as a feature vector of components. The system can include a means for combining the feature vectors of the plurality of reference objects to produce a composite reference vector, and a means for comparing the composite reference vector to the feature vectors of each of the media objects in the collection of media objects.

The invention can be implemented to realize one or more of the following advantages. A user can define search criteria that reflect the user's search intent in conducting a search of a set of media objects. A user can define search criteria that reflect the user's search intent even when the intent is not clearly defined by a reference or by information associated with objects. The search criteria can be defined by selecting a set of reference objects. The search criteria can be defined automatically given a selection of reference objects. Search criteria can be defined as commonalities or the intersection among objects in a set of objects. Search criteria can be defined as inclusive or the union of features in a set of objects. A user can refine the search criteria according to the user's search intent. The search criteria can be redefined by adding an object to a set of reference objects. The search criteria can be weighted according to a combination of information for a set of images. A user can use different types of media objects to define the search criteria. A user can search one type of media object using search criteria defined by another type of media object.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

A collection of media objects can be searched to identify a particular object or objects in the collection based on features of a reference object. The use of a reference object to search a collection of media objects is ambiguous, at least in part, because the features of interest in the reference object are often ill-defined or inappropriately ranked in terms of their importance for the search. For example, it is typically unclear which features of a reference object are of interest. Even if features of interest are specified, the relative importance of various aspects of the features, such as color, texture, and shape, is typically undefined. Moreover, the reference may not include features or aspects that are of interest to a user.

By using multiple references to characterize and refine search criteria, the ambiguity that is inherent in using a reference object to define the search criteria can be partially or wholly resolved. Multiple reference objects are used to create a composite reference and, if desired, a weighting of features. The composite reference and any weighting of features are defined by evaluating features of the selected reference objects—for example, by finding commonalities among or differences between the selected reference objects. The composite reference and/or weighting can be further refined with the selection of additional reference objects. In this way, the search criteria can be adjusted to better express or reflect a user's search intent.

Figure 1:
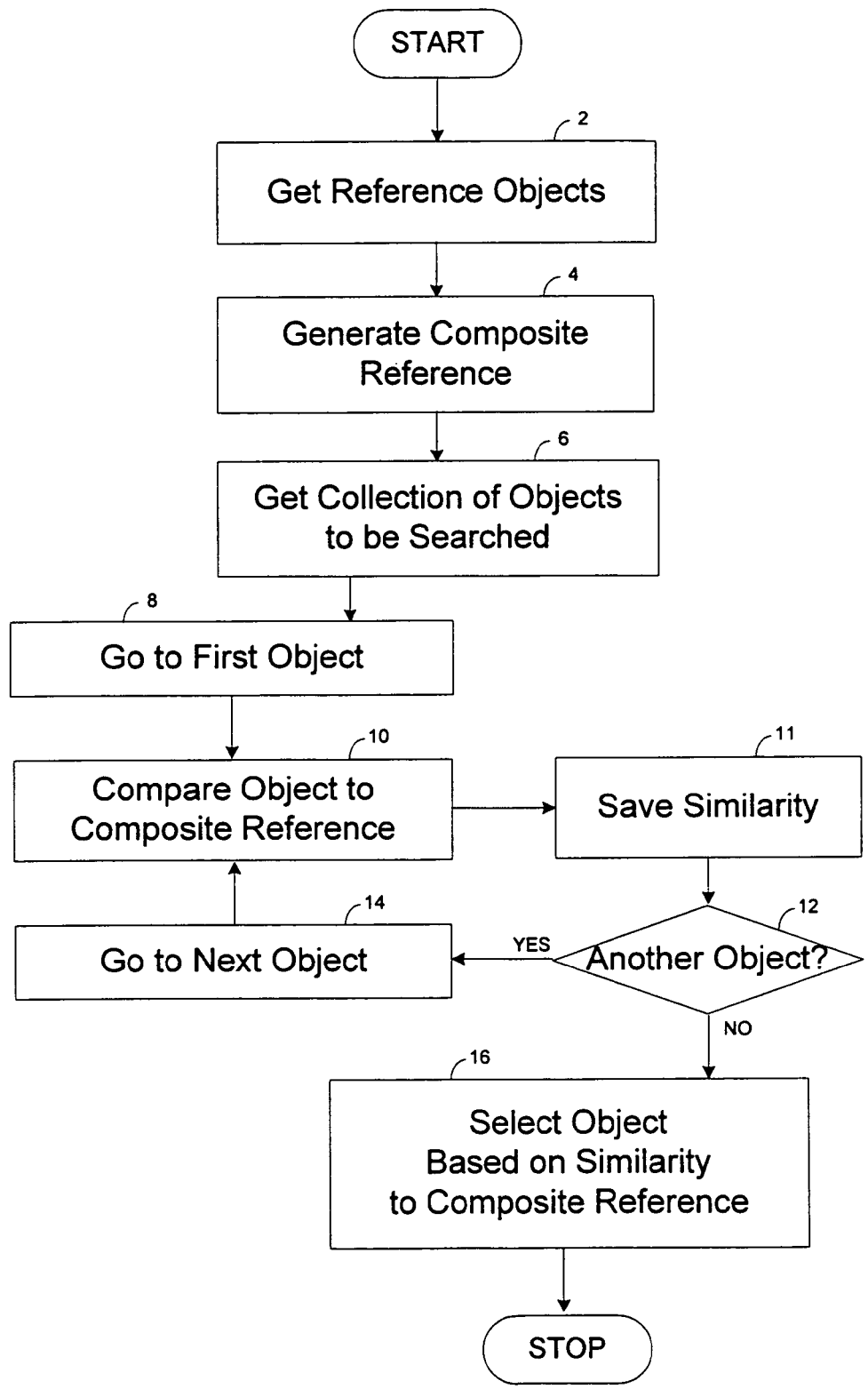
FIG. 1 describes a method for searching using multiple reference objects.

FIG. 1 illustrates a method for searching a collection of objects based on features of multiple reference objects. Two or more reference objects are selected (step 2). The reference objects can be selected from the collection of objects to be searched. Alternatively, the reference objects can be selected from other sources, such as a predefined collection of reference objects. The reference objects can also be supplied by the user, such as by importing a desired reference object from an external source, or by creating the reference object, e.g., using a drawing or painting program on a computer. The reference objects are used to generate a composite reference (step 4). The composite reference can include, for example, information about features that are common to the reference objects or features that occur in any of the reference objects.

A collection or set of objects to be searched is identified (step 6). Starting with a first object in the collection (step 8), the object is compared to the composite reference (step 10). The results of the comparison, for example, a measure of similarity, are typically saved or stored (step 11). If there is another object (the YES branch of step 12) in the collection of objects to be searched, it is compared to the composite reference (steps 14 and 10). The method proceeds until there are no more objects (the NO branch of step 12) in the collection of objects to be searched.

An object or objects in the collection of objects that satisfy search criteria defined at least in part by the composite reference can then be selected (step 16) based, for example, on the object's or objects' similarity or dissimilarity to the composite reference. Optionally, some or all of the objects in the collection can be ranked according to their similarity or dissimilarity to the composite reference. The identified object or objects, and the ranking, can be presented to a user.

Figure 2:
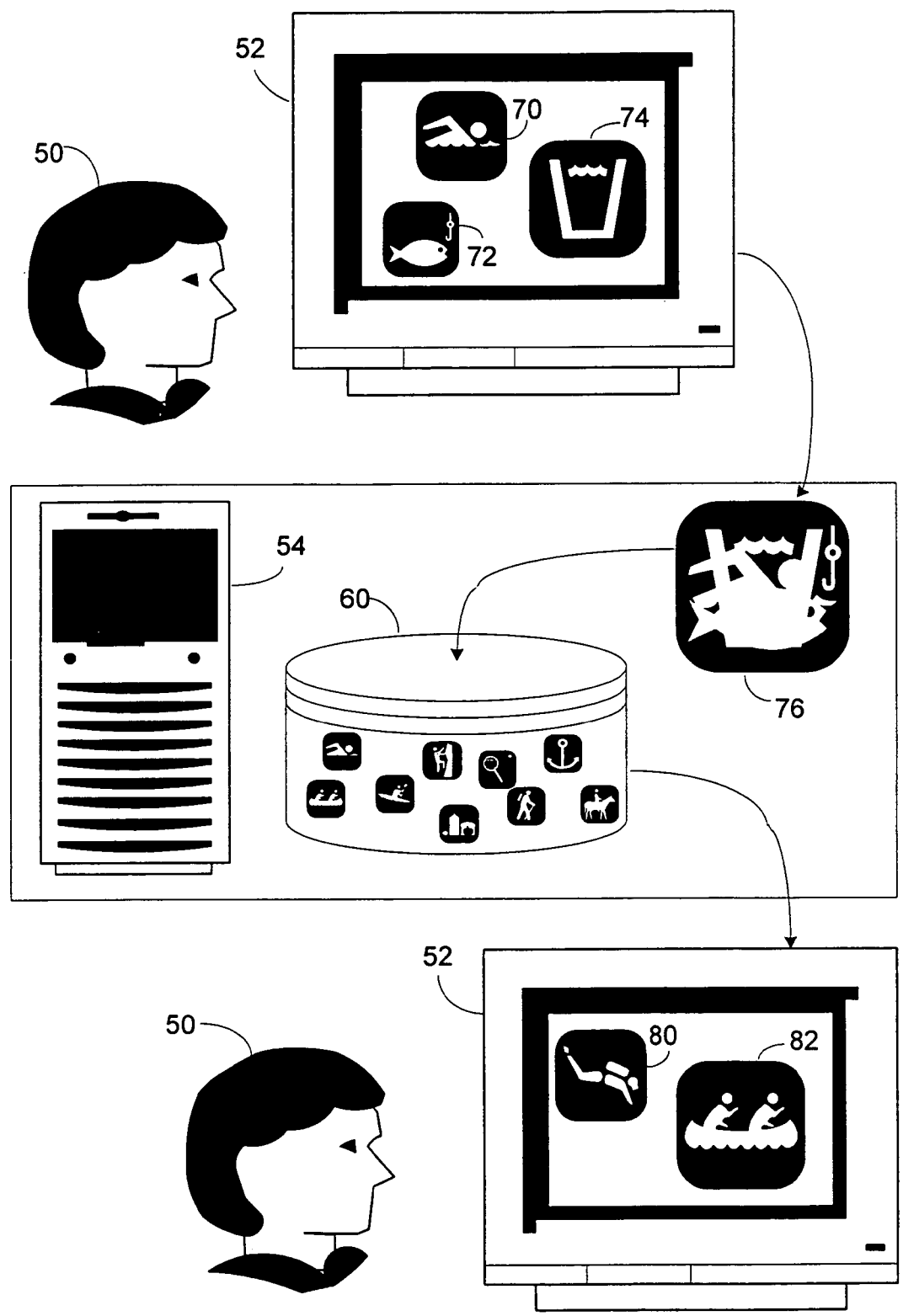
FIG. 2 portrays the use of a method for searching using multiple reference objects by a user in a computer environment.

As shown in FIG. 2, the search techniques described herein are typically implemented in a computer environment. For example, a user 50 uses a monitor 52, speaker, or other device to receive information from a computer 54. The computer can be, for example, a personal computer or a server on a network. A collection 60 of media objects is maintained in storage on the computer 54, for example, in a file system or database. The user 50 selects two or more objects 70, 72, 74 for a search of the collection 60. The objects can be from the collection or from another source. The objects can, for example, be images and the user may desire to find an image that shares certain features with the selected images 70, 72, 74. A composite 76 of the selected objects is created. Objects in the collection 60 are then compared to the composite 76, and one or more images 80, 82 are selected. These images may be, for example, the objects in the collection that are most similar to the composite. The images can then be displayed to the user 50 on the computer monitor 52. The process can be repeated. For example, the search can be refined by using the composite reference 76 or one of the initial reference objects 70, 72, 74 and one of the images 80, 82 identified in the search.

In general, the purpose of a search using a reference is to find objects in a collection that are similar in some way to the reference. The search is specified by the reference and a comparison function, which is used to assess the similarity of the reference to the objects being searched. The reference can be a single object or a composite reference. It includes at least some features or aspects that are of interest, but can include features that are not of interest, as well. The comparison function can specify weights that control the balance of features that are considered in assessing similarity, and can be used to limit or tailor the search. For example, the comparison function can define the scope of the search, such as whether it is to be carried out globally or locally, and it can specify criteria for similarity, such as the range of sizes or orientations that are to be considered similar. In the search, the similarity of the objects in the collection to the reference is determined according to the comparison function. The objects can be ranked as more or less similar to the reference according to their similarity values so that a user can select, for example, the most or least similar object, or a set of most or least similar objects.

A search that is defined by a reference and a comparison function may fail to produce objects that satisfy a user's search intent, even if such objects are available in the collection of objects being searched. The search can be focused or refined by combining information for an additional reference with the previous reference or references. This combination produces composite reference information if a single reference was used previously, and redefines composite reference information that was used previously. References can be combined, for example, to encompass characteristics of any of them, or to specify characteristics that are common to all of them. The references also can be used to define a weighting of features, and can be used to define a new comparison function. The composite reference information, the weighting, if any, and the new comparison function, if any, define new search criteria that form the basis for a new search.

A collection of media objects to be searched can include image objects or files, as well as audio objects or files, text objects or files, and objects or files that include combinations of media types such as image, audio, and text. Typically, such media objects will include digital data. Image objects can be searched for visual features such as particular objects, color, texture, and shape. Audio objects can be searched for sound features, such as particular sounds or words, tone, amplitude, and loudness. A text object, such as an electronic book, can be searched for language features such as particular words or phrases, sentence patterns, or grammatical structures.

Combination media can encompass, for example, audio, image, and text data, and can be searched, for example, for audio, image, or text features. For example, a video can be searched for features of a particular image or for features of a person's voice. The video can be searched by treating each frame as a separate image and comparing each frame to the desired images features. Also for example, a book that includes both text and images can be searched for images. The similarity of each image in the book to the image features can be determined. The book or video can be evaluated as more or less similar to the image features, for example, based on one or more of the similarity measures of the images in it.

Media of different types can be combined to search media of the same or different types. Such mixing of media requires that the media objects have similar or analogous features. Different types of media objects can, for example, have features that are not specific to the media type, such as pattern, variability, and periodicity. Such features can be combined and used to search objects irrespective of object type. Features of one type also can be translated or converted into features of another type.

Figure 3:
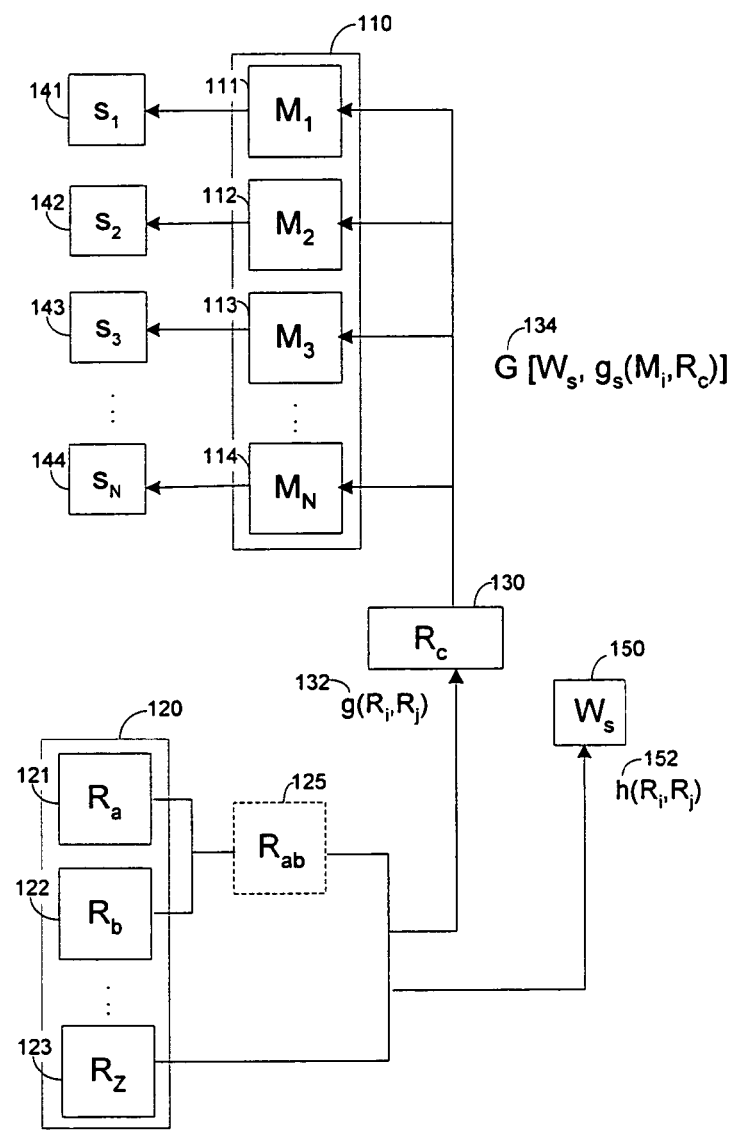
FIG. 3 shows a method for using multiple media objects to create composite reference information and search media objects.

As shown in FIG. 3, a collection or set of media objects 110 includes two or more media objects 111-114. If there are N media objects, $M_a$, in the set of media objects, then $\{M_a\}=\{M_1, M_2, \ldots M_N\}$. Similarly, a set of reference objects 120 includes one or more media objects 121-123. If there are Z reference objects, $R_a$, in the set of reference objects, we have $\{R_a\}=\{R_1, R_2, \ldots R_z\}$. In this case, Z references objects are combined to search N media objects.

Information for each of two or more reference objects 121-123 is combined to create composite reference information, $R_c$ 130. The information can be combined, for example, according to a function of two reference objects, g $(R_i, R_j)$ 132. If there are only two reference objects, for example $R_a$ and $R_b$ 121-122, information for each of the two reference objects is combined such that $R_c=g(R_a, R_b)$. If there are more than two reference objects, their object information can be combined in a pair wise sequence. For example, information for the reference objects $R_a$ and $R_b$ 121-122 can be combined to, create composite reference information $R_{ab}$ 25, such that $R_{ab}=g(R_a, R_b)$. The composite reference information $R_{ab}$ 125 can then be combined with information about a third reference object, for example $R_Z$ 123, to create the composite reference information $R_c$ 130, such that $R_c=g(R_{ab}, R_Z)$.

Information from an additional object or from other combined objects can be added to existing composite reference information, allowing information for many reference objects to be combined. More than one function can be used to combine information from more than two reference objects 121-123 in the set of reference objects 120. Object information can be combined by a weighted sum of reference object information. If the reference images are ranked in importance, then the rank may serve as the weights. Object information for more than two reference objects can be combined directly, for example, by summing, rather than by pair wise application of the function, g.

The composite reference information 130 is compared to information for each of two or more media objects 111-114 in the collection or set of media objects 110 using a function, G 134. The function G determines similarity, s 141-144, between the composite reference information and the information for each media object. The similarity values 141-144 can be used to rank the associated media objects 111-114 as more or less similar to the composite information $R_c$ 130 that was derived from the reference objects 121-123.

The function G 134 can include elements that are similar or identical to the function, g 132, which is used to combine information for two or more reference objects. For example, the element $g_s(M_1, R_c)$, of the function G can be similar or dissimilar to the function g 132. In this way, a user can independently tailor the combination and comparison functions according to the user's search intent. For example, a user can combine references to create an inclusive reference, and then search for objects that are more strictly similar to the reference. Also for example, a user can choose a comparison function that complements the combination function, for example, by using a comparison function that builds on the combination function.

The function G can include a weighting element, $W_s$ 150. The weighting element can be derived from information for one or more of the reference objects 121-123, for example, by combining information about each of two or more reference objects 121-123 according to a function, h $(R_i, R_j)$ 152. If there are only two reference objects, for example $R_a$ and $R_b$ 121-122, information for each of the two reference objects is combined such that $W_s=h(R_a, R_b)$. If there are more than two reference objects, their object information can be combined in a pair wise sequence as described previously, such that, for example, $W_s=h(R_{ab}, R_Z)$, where $R_{ab}=h(R_a, R_b)$. The function h is typically identical to the function g, in which case h $(R_a, R_b)=g(R_a, R_b)$ and $R_c=W_s$.

Information that is used to characterize the features of media objects can be summarized by a set of parameters. For example, information characterizing a media object can be summarized as a series of values in a vector, referred to as a "feature vector." A feature vector preferably includes information that is created or derived by analyzing part or all of a media object with one or more particular analytical methods. A feature vector can also include information that is associated with the object or the analysis of the object. Such information is commonly referred to as metadata.

Figure 4:
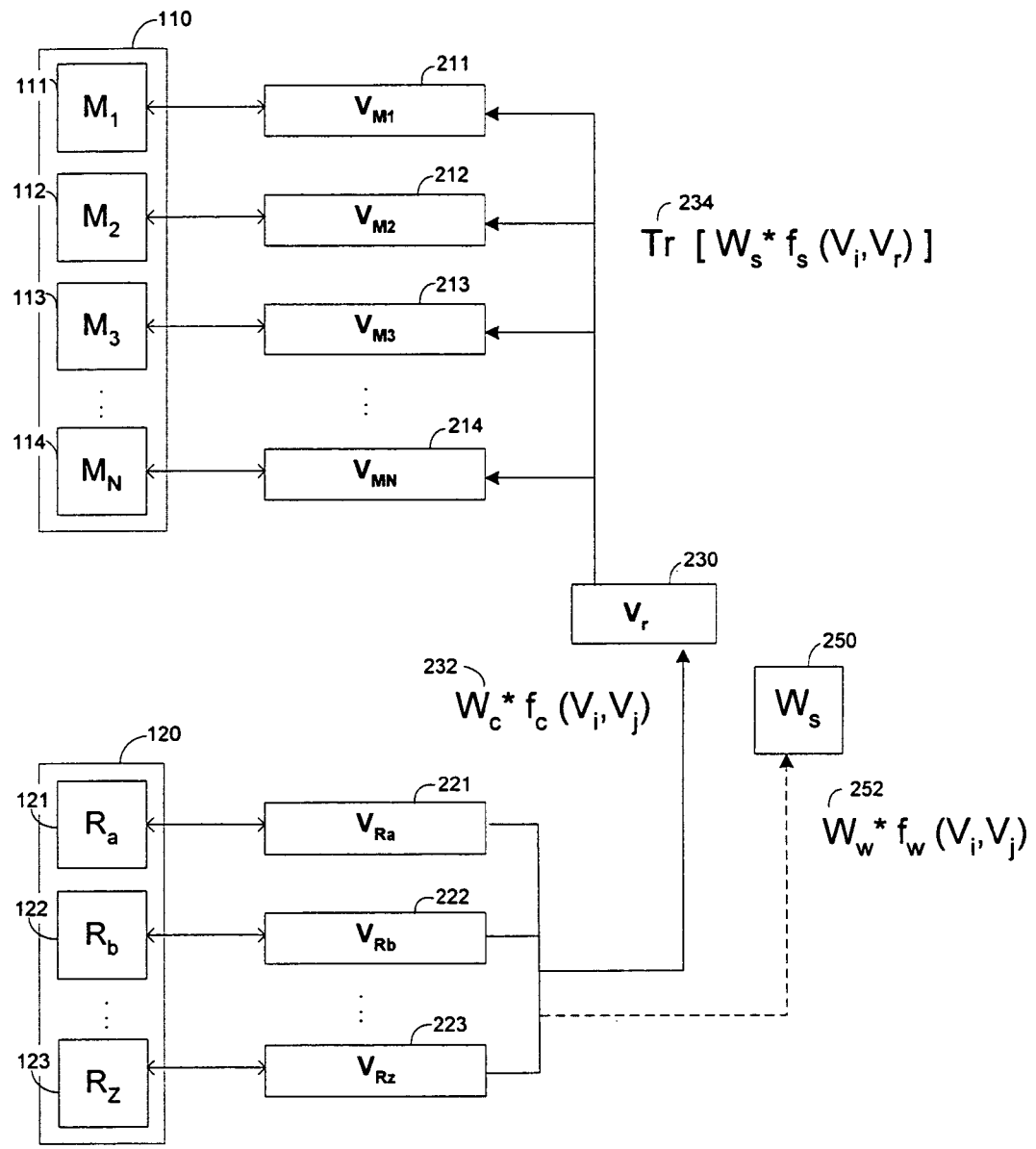
FIG. 4 shows a method for using feature vectors of multiple media objects to create a reference vector and search media objects.

An example of a search that uses feature vectors to combine information for multiple references and search a set of media objects is shown in FIG. 4. Each media object 111-114 in a set of media objects 110 can have a corresponding feature vector $V_M$ 211-214. If there are N media objects, $M_a$, in the set of media objects, we have $\{M_a\}=\{M_1, M_2, \ldots M_N\}$ and N corresponding feature vectors, $V_{M1}, V_{M2}, \ldots V_M$. Similarly, each media object 121-123 in a set of reference objects 120 has a corresponding feature vector, $V_R$ 221-223. If there are X reference objects, $R_a$, in the set of reference objects, we have $\{R_a\}=\{R_1, R_2, \ldots R_X\}$ and Z corresponding feature vectors, $V_{R1}, V_{R2}, \ldots V_{RZ}$. The feature vectors for the media and reference objects typically will have the same or similar components.

The feature vectors 221-223 corresponding to the set 120 of reference objects 121-123 are combined to create a composite reference vector 250. The feature vectors 221-223 can be combined, for example, according to a function of two feature vectors, $f_c(V_i, V_j)$ 232, for example, in a pair wise fashion, as described previously for information about reference objects.

The composite reference vector 230 is compared to the feature vectors 211-214 for each of two or more media objects 111-114 in the collection of media objects 110 using a function such as $Tr[W_s*f_s(V_i, V_r)]$ 234, where Tr indicates the sum of the components in the vector $[W_s*f_s(V_i, V_r)]$. If there are Z components, c, in each of the vectors $W_s, V_i,$ and $V_r$, then $Tr[W_s f_s(V_i, V_r)]=\Sigma_{(c=1 \ldots z)}[W_s[c] f_s(V_i[c], V_r[c])]$. For example, if $[W_s*f_s(V_i, V_r)]=X$ and X has Z components, then $Tr[W_s*f_s V_i, V_r)]=Tr X=X_1+X_2+X_3 \ldots X_Z$. As for the function G 134, discussed previously, the function $Tr[W_s*f_s(V_i, V_r)]$ 234 determines similarity, si 141-144, between the composite reference vector and a feature vector for a media object, i 111-114. The similarity values can be used to rank the associated media objects 111-114 as more or less similar to the composite reference vector 230 that was derived from the feature vectors 221-223 of the reference objects 121-123.

The function $Tr[W_s*f_s(V_i, V_r)]$ 234 can include elements that are similar or identical to elements of the function, $W_c*f_c(V_i, V_j)$ 232. For example, it can be that $f_s(V_i, V_r)=f_c(V_i, V_j)$. The function $Tr[W_s*f_s(V_i, V_r)]$ 234 also can include a weighting element, $W_s$ 250. The weighting element can be derived from the feature vectors 221-223 for one or more of the reference objects 121-123. A weighting element can be derived, for example, according to a function of two feature vectors, $W_w*f_w(V_i, V_j)$ 252, which can be applied in a pair wise repetitive fashion as described previously to combine the feature vectors for multiple reference objects.

The function $W_w*f_w(V_i, V_j)$ 252 can include elements that are similar or identical to elements of the functions $W_c*f_f(V_i, V_j)$ 232 or $Tr[W_s*f_s(V_i, V_r)]$ 234. For example, it can be that $f_w(V_i, V_j)=f_f(V_i, V_j)$ or $f_w(V_i, V_j)=f_s(V_i, V_j)$. Similarly, it can be that $W_w=W_c$ or $W_s=W_c$.

The feature vectors for media objects, including reference media objects, will now be discussed in more detail. A feature vector is typically a one-dimensional vector of components. For example, the feature vector, V, is a series of W components such that $V=\{V_1, V_2, \ldots V_W\}$.

Figure 5:
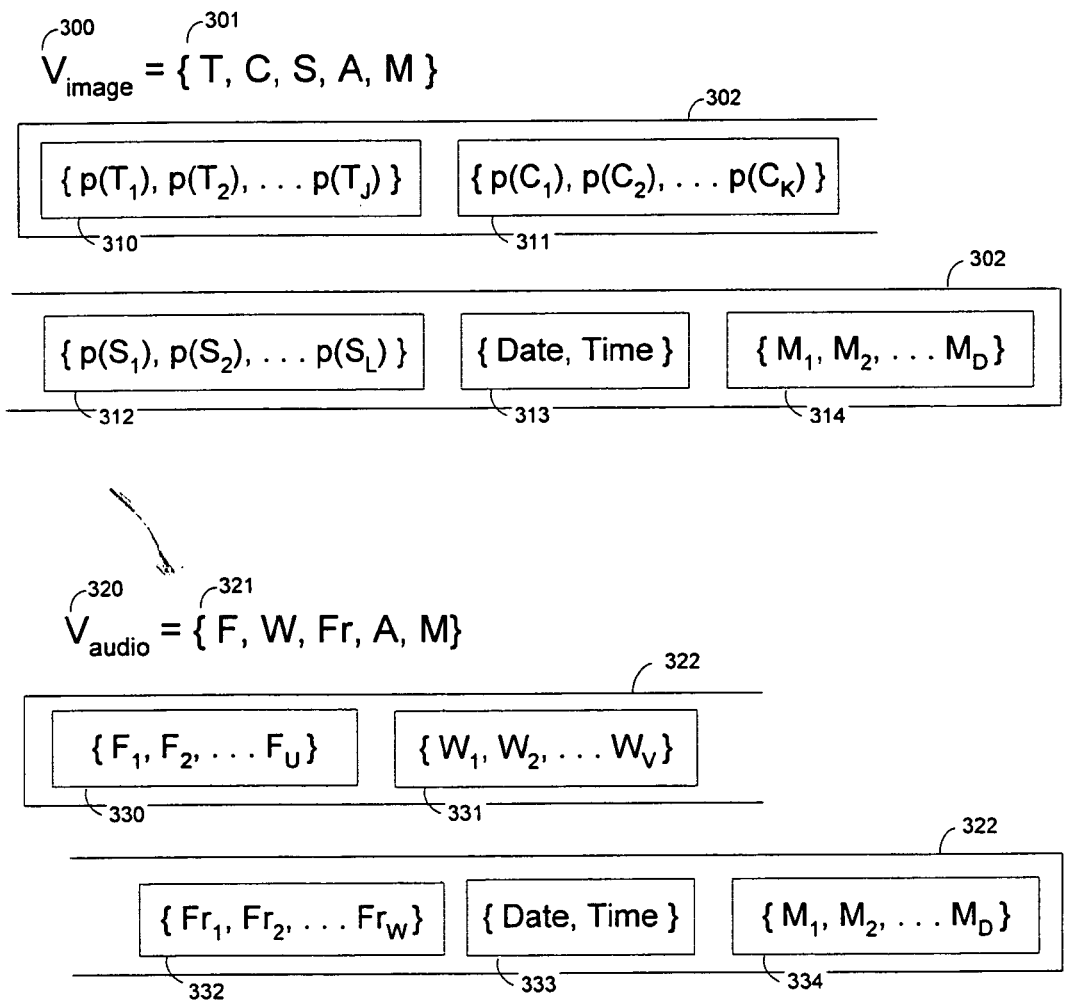
FIG. 5 shows a feature vector for an image object and a feature vector for an audio object.

As shown in FIG. 5, a feature vector 300, 302; 350, 352 can include sets of components 310, 301-314; 321, 330-334. The components of a feature vector can be grouped into sets and subsets according, for example, to the type of information of the components or the method by which the components were created or derived. For example, the first 1000 components of a feature vector may be derived from an analysis of the media object and the last 3 components of the feature vector may be information associated with the media object. In this example, the first 1000 components can, for example, be derived from determining the proportion of the image that is each of 1000 colors and the last 3 components can, for example, be the date and time that the object was created and the filename of the object.

Components of some sets can be derived from the media object. For example, a feature vector for an image object can include sets of components describing texture, T 310, color, C 311, and shape, S 311, each of which are derived by analysis of some or all of the image data. Also for example, a feature vector 350, 352 for an audio object can include sets of components describing Fourier transform information F 330, wavelet decomposition information, W 331, and fractal measures, Fr 322, each of which are derived by analysis of some or all of the audio data. A feature vector can include components that are derived from the analysis of more than one type of media in the object. For example, a feature vector for an audio-visual object can include fractal measures derived from the analysis of combined audio and visual parts or aspects of the object.

Components of other sets can include information associated with the image or audio object, or metadata. For example, set D 313, 330 can include the filename and the date and time that the image or audio object was created, copied, or stored, and set M 314, 334 can include information about the analyses used to derive the components in other sets.

The number of components in a feature vector 300, 350 is the sum of the number of components in each set of components in the feature vector. For example, if there are J, K, L, 2, and D components in sets T, C, S, A, and M, respectively, then the feature vector 300 has J+K+L+2+D components. That is, $V_i=\{T_i\ (i=1\ \ldots\ J), C_i\ (i=J+1\ \ldots\ J+K), S_i\ (i=J+K+1\ \ldots\ J+K+L), A_i\ (i=J+K+L+1\ \ldots\ J+K+L+2), M_i\ (i=J+K+L+3\ \ldots\ J+K+L+2+D)\}$. Similarly, if there are U, V, W, 2, and D components in sets F, W, Fr, A, and M, respectively, then the feature vector 350 has U+V+2+D+W components.

Various numerical and statistical methods can be used to derive or create the components in a set in the feature vector of an image object. The methods that are used may depend upon the kind of data in the object. For example, image objects may include raster graphics and raster data, or vector graphics and vector data. Vector data can be used to create components that describe, for example, the number of objects or strokes in the image, or the number of certain special effects in the image.

Unlike vector data, raster data must be segmented or otherwise analyzed to identify objects or shapes in an image. Shapes can be defined, for example, by determining regions of approximately constant color. Rectangular shapes can be found using the method described in U.S. Pat. No. 6,298,157, "Locating and aligning embedded images" which is hereby incorporated by reference in its entirety. A raster image can be segmented, for example, by flood-filling regions of similar color and texture, imposing penalties for crossing edges.

Components in a shape set, S 312, of a raster or vector image object can be created or derived by finding or defining shapes in the image and then measuring shape characteristics for each shape. Shape characteristics can include measures of symmetry, ellipticity, or prolateness, for example. Shape characteristics can be defined, for example, as the fractal dimension of the perimeter or, more simply, as a list of points along the curve of the perimeter of the shape or a list of tangent angles along the perimeter.

Components in the color set, C 311, of an image object can be created or derived by analyzing the image according to one or more color spaces. A color space provides a data representation for a range of colors in terms of basic color components (or "colorants"). The specific colorants depend on the color system used. For example, in the CMYK color system, colors are represented as combinations of values for cyan (C), magenta (M), yellow (Y), and key (K) (generally black); in an RGB color system, colors are represented as combinations of values for red (R), green (G), and blue (B); and in the HSB color system, colors are represented as combinations of values for hue (H), saturation (S) and brightness (B).

Color components can include, for example, measures of the mean and standard deviation of colors in the image, or a list of the dominant or most common colors. Color components can describe a frequency distribution of colors, or the entropy of such a distribution. Color components can include the products of spatial coordinates with color. For example, components can be defined by <r C>, where r is the vector or spatial dimensions and C is the vector of color dimensions. <r C> is defined as $1/R\ \Sigma_{r=1\ \ldots\ R}\ (r_i\ C_a(r))$, where there are R locations, r, and where $r_i$ is one of the spatial coordinates at r and $C_a(r)$ is one of the color dimensions for the color at r. Such products can include higher spatial frequencies, for example, $<r\ r\ C>=1/R\ \Sigma_{r=1\ \ldots\ R}\ (r_i\ r_j\ C_a(r))$ or <r r r C>. Components can include the mean and standard deviation for the products of spatial coordinates with color.

Figure 7:
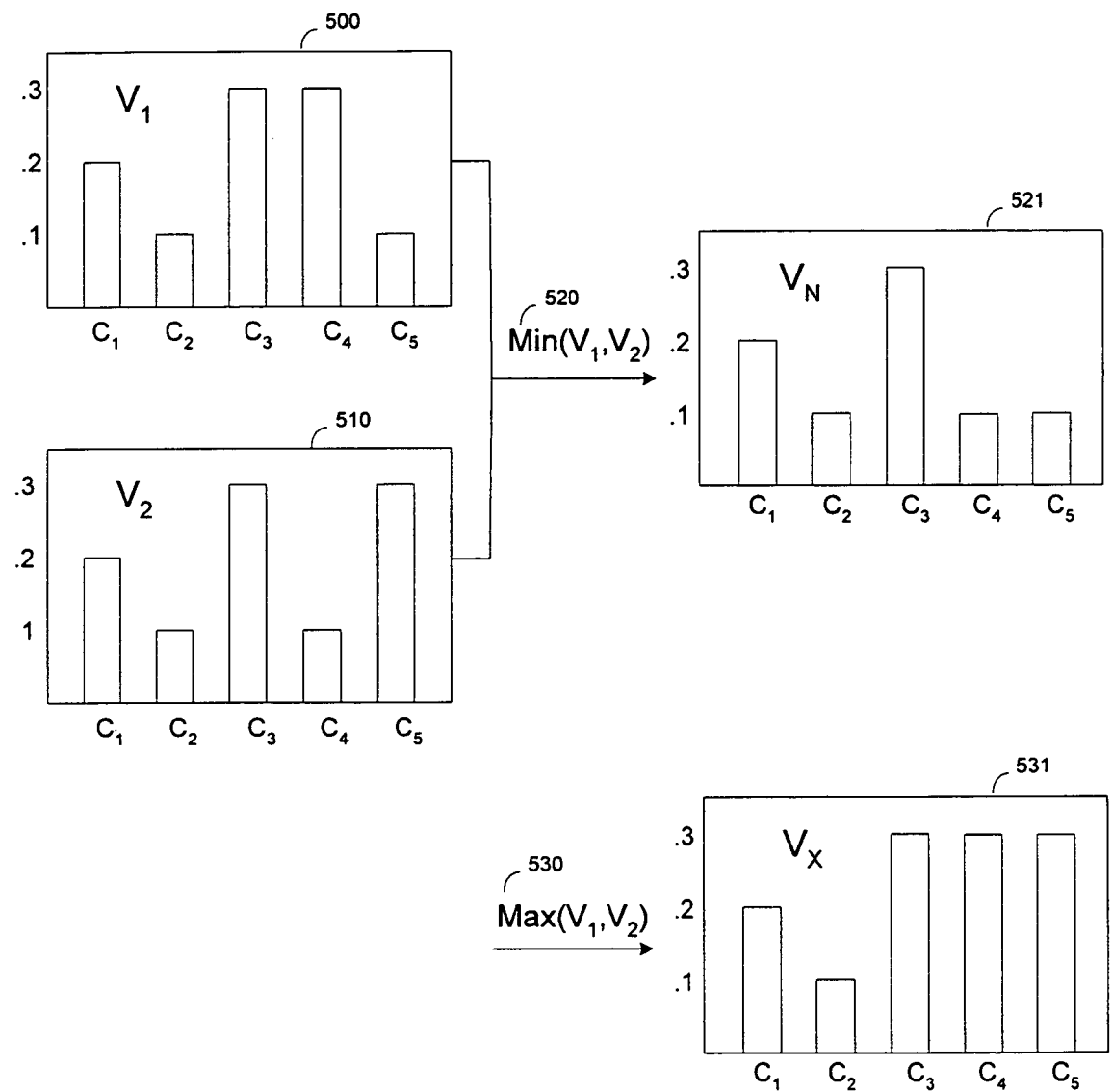
FIG. 7 shows the application of the Min and the Max functions to combine or compare a set of discrete components from two feature vectors.

In a frequency distribution of colors, for example, each of the components in the set C 311, $p(C_i)$, can represent the frequency of occurrence in the image of one of K colors. That is, each component can describe the fractional area of the image covered by a color, $C_i$. For example, an image can be divided into five colors such that one-fifth of the image is one color, one-tenth is another color, three-tenths is a third, three-tenths is a fourth color, and one-tenth is a fifth color. The set C for such an image is {0.2, 0.1, 0.3, 0.3, 0.1}. The set C can be viewed as a frequency plot 500, as shown in FIG. 7.

For raster data, an image is made of pixels and each pixel, r, is of a certain color, C(r). The color is typically represented by a series of bits (the "color value"), with specific bits indicating the amount of each colorant used in the color, as discussed previously. The value $p(C_i)$ can be calculated as the number of pixels of color i divided by the total number of pixels, R. That is:

$$p(C_i)=1/R\ \Sigma_{r=1\ \ldots\ R}\Delta(C_i,C(r)),$$

where $\Delta(C_i, C(r))=1$ if C(r) found to be the same as the color $C_i$, and 0 if C(r) not found to be the same as the color $C_i$.

In this example, the sum of the $p(C_i)$ over all possible colors in an image is unity:

$$\Sigma_{i=1\ \ldots\ K}p(C_i)=1.$$

However, functions that do not have the property of summing to unity are possible and can be used as well. For example, the function $p(C_i)=\Sigma_{r=1\ldots R} \Delta(C_i, C(r))$, for which $\Sigma_{i=1\ldots K} p(C_i)=R$, can be used. Also for example, an incomplete set of properties can be used. For example, a color space may be divided into K colors but information for only some, H, of those colors may be included in the feature vector. That is, if $\Sigma_{i=1\ldots K} p(C_i)=1$, the feature vector can include only $C_i$ where i=1 . . . H and H<K, such that $\Sigma_{i=1\ldots H} p(C_i)<1$.

For vector data, a similar color distribution table can be produced by other means. For example, a grid can be mapped to the data, and each cell in the grid can then be treated as a pixel would be treated to calculate the color distribution. Also for example, the image can be divided or flattened into constant color regions, and entries can be placed in the color distribution table in proportion to the size of the regions of corresponding color. In yet another example, a color distribution can be produced from the distribution of line and fill colors of individual vector objects in the image object.

Components in a texture set, T 310, of a raster or vector image object can be created or derived, for example, by calculating the statistical moments of Gabor filter values for the image data. Such an analysis captures edge information in the image. Texture components can be fractal measures of the image. Texture components also can be coefficients for a wavelet decomposition or Fourier transform of the image data, or the means and standard deviations of the coefficients. Correlations between color components at two and more locations can be used as texture components.

Numerical and statistical methods, including those used to derive or create the components in a feature vector of an image object, can be used to derive or create the components in a feature vector 320 of an audio object. Features can be calculated for the audio track as a whole, or for each of two or more segments of the track. The components of F 330 can, for example, be derived from a Fourier transform of the audio data. The components of W 331 can, for example, be derived from a wavelet decomposition of the audio data. The components of Fr 332 can, for example, be the fractal dimension of the data, or the standard deviation of the fractal dimension. Components in the feature vector of an audio object can include a power distribution of audio frequencies, analogous to the distribution of color discussed previously.

Figure 6:
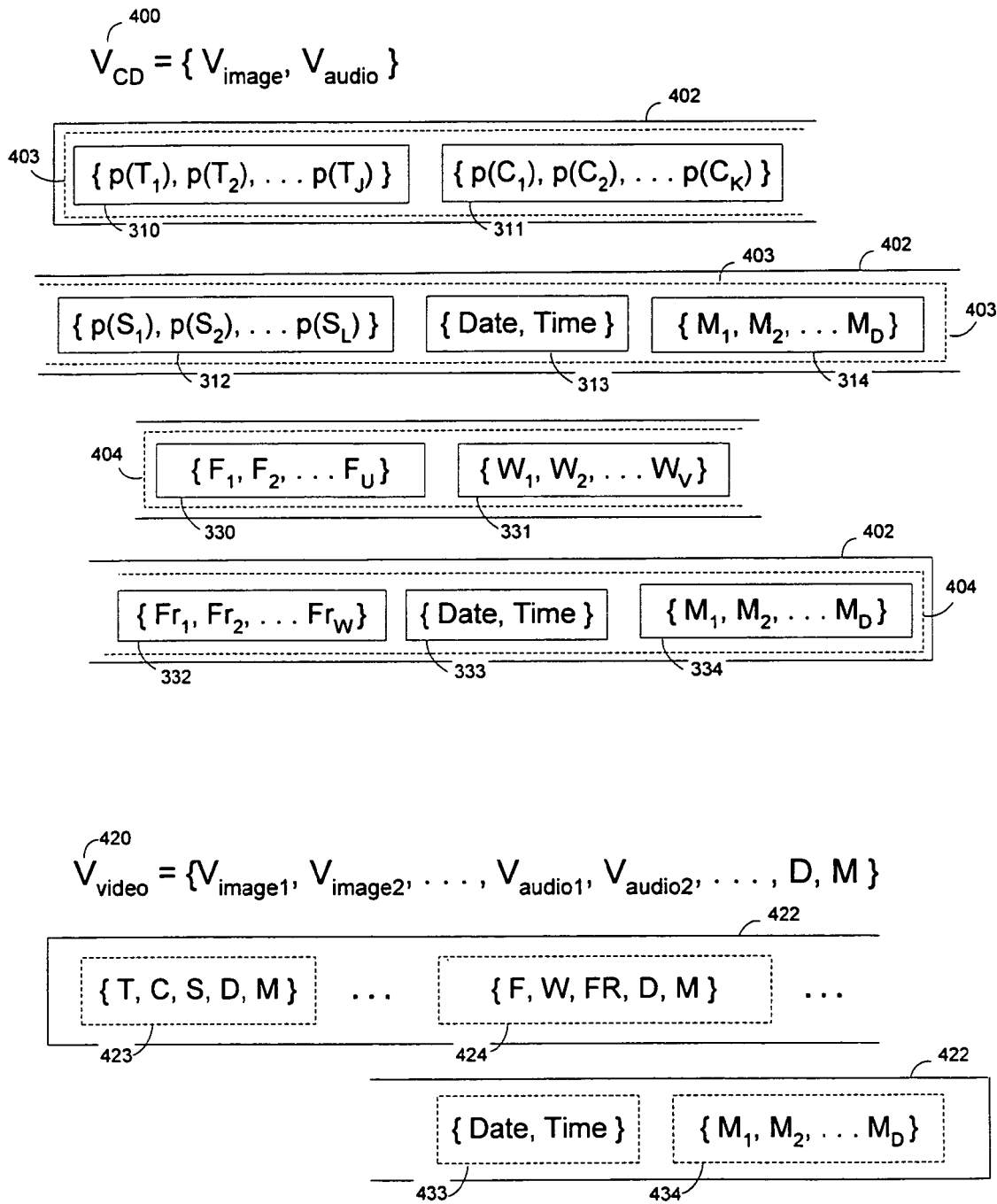
FIG. 6 shows a feature vector for a CD object, and a feature vector for a video object.

As shown in FIG. 6, a feature vector 400, 401 for a media object that has both image and audio information, such as a compact disc or CD, can include a set of image components 403 and a set of audio components 404, as well as components that describe the object in its entirety, as described previously. The image components can include components and sets of components 310-314 as for an image object, as discussed previously, and the audio components can include components and sets of components 330-334 as for an audio object, as discussed previously.

A feature vector 420, 422 for a video object can include multiple sets of image components 423 and audio components 424. For example, the feature vector can include a set of image components for key frames in the video. There can be components that describe temporal relationships among images, such as the number of scene changes and their duration. A measure of optical flow can be used to describe the amount of motion in the video; this measure can be used, for example, to distinguish surveillance tapes with activity from those without activity. A feature vector for a video can also include components 433 derived from part or all of the object, as discussed previously, and metadata 434 for part or all of the object.

Similar methods can be used to derive or create the feature vector components of different types of media objects or different segments of a combination media object. For example, a cepstral decomposition, in which, for example, Fourier or wavelet frequency components taken over a local time window are plotted as a function of time (that is, location in the audio track), can be used to create a two-dimensional "image" of the audio signal. Such a two-dimensional audio object can then be described with components as for an image object. For example, an audio texture feature can be produced by wavelet decomposition of the two-dimensional audio object or segment, while an image texture feature can be produced by wavelet decomposition of an image object or segment. The audio object's temporal frequencies then can be mapped onto the image's spatial frequencies. With an appropriate choice of scales, features created for audio and image objects or segments can be combined and compared.

A feature vector for a text object can include components that characterize the whole text or parts of it, for example, chapters or paragraphs. The components can be derived from statistical measures of parts of the text, such as the co-occurrence probabilities of semantic concepts or words, using, for example, bigrams, trigrams, and so on. Text can be mapped to a semantic tree that is used as the feature. Components in the feature vector of a text object can include a distribution of frequencies of words or other constructs, analogous to the distribution of color discussed previously. Methods similar to these and others described previously can be used to derive or create components for feature vectors of other types of media.

The functions 232, 234 for combining and comparing feature vectors will now be discussed in more detail. These functions 232, 234 typically include a function, f, of two feature vectors, but can include a function of more than two feature vectors. The function, f, typically evaluates one or more components of the feature vectors. Typically, the function does not find a Euclidian distance between two or more vectors. The function represents a combination of the features described by the feature vectors. For example, the function can approximate the intersection or union of features. The function can approximate other non-Euclidean combinations of features, as well. Two examples of such a function will now be discussed in more detail.

As shown in FIG. 7, the components of two feature vectors 500, 510 can be combined or compared, for example, by determining their joint minimum, Min 520, or joint maximum, Max 530. In this example, the components in the set C of the feature vectors $V_i$ 500 and $V_2$ 510 are scaled to range from 0 to 1, as discussed previously. For $V_i$ 500, C={0.2, 0.1, 0.3, 0.3, 0.1}, indicating that one-fifth of the first image is $C_1$, one-tenth is $C_2$, three-tenths is $C_3$, three tenths is $C_4$, and one-tenth is $C_5$. The sum of the components is 1.0 because all colors in the first image were tabulated. For $V_2$ 510, C={0.2, 0.1, 0.3, 0.1, 0.3}, indicating that one-fifth of the second image is C1, one-tenth is C2, three-tenths is C3, one-tenth is C4, and three-tenths is C5. The sum of the components is 1.0 because all colors in the second image were tabulated.

Figure 8:
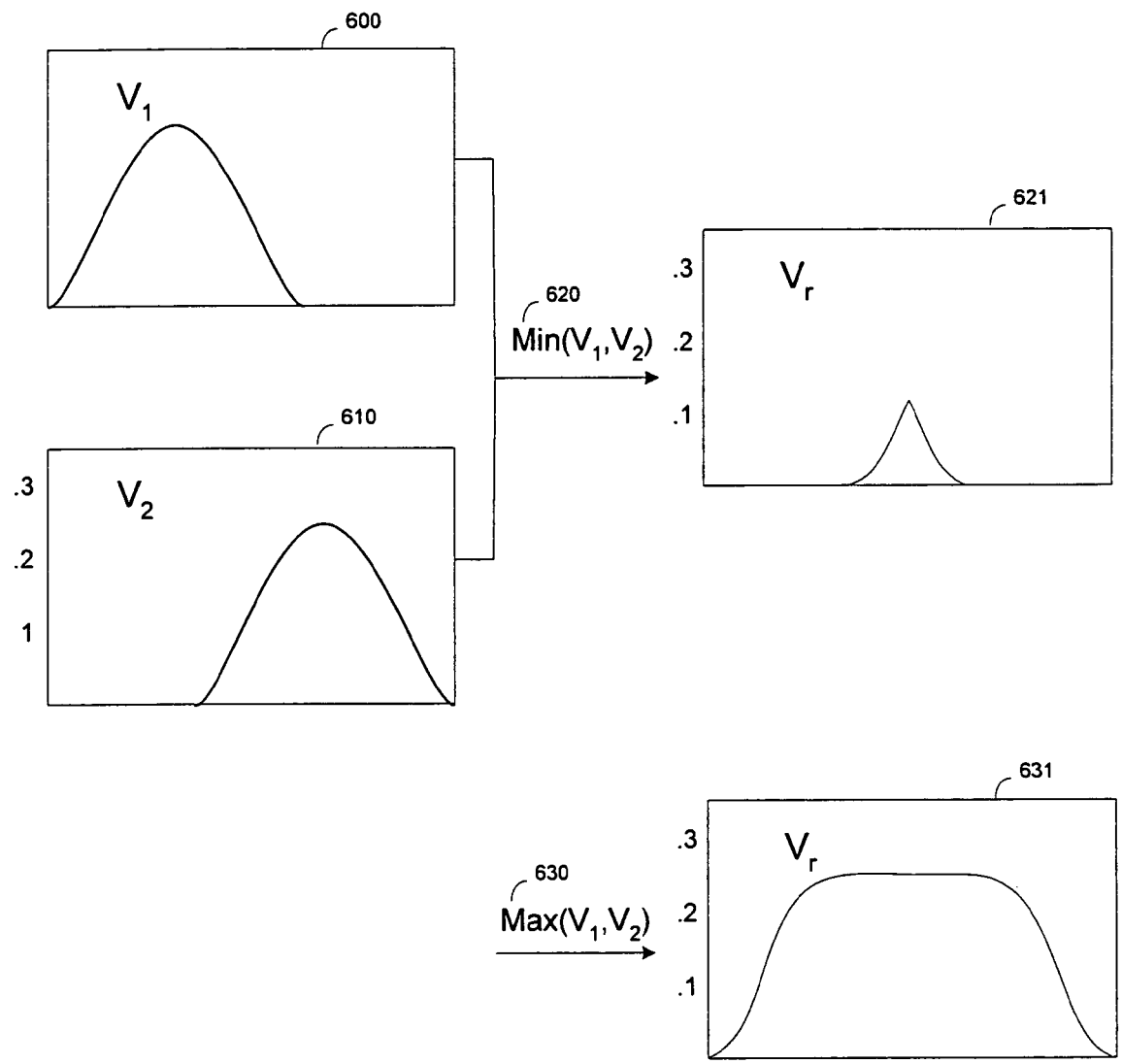
FIG. 8 shows the application of the Min and the Max functions to combine or compare components from two feature vectors that approximate continuous functions.

A Min function determines the intersection of the sets or functions defined by two vectors. The vectors $V_1$ and $V_2$ are combined or compared using a "Min" 520 function by determining, for each component, the smaller of the values for the two vectors. For example, the value of $C_4$ for $V_i$ is 0.3 and the value of $C_4$ for $V_2$ is 0.1. The smaller value, 0.1, is represented in the resulting combination or comparison vector, $V_N$ 521. In this example, the combination or comparison vector, $V_{min}=V_N$, has C={0.2, 0.1, 0.3, 0.1, 0.1}. For a very large set, the components of C may approximate a continuous function 600, 610, as shown in FIG. 8. The application of a Min function 620 to two offset and approximately normal functions 600, 610 produces a peaked curve 621, which represents the region of overlap of the two functions.

A Max function determines the union of the sets or functions defined by two vectors. The vectors $V_1$ and $V_2$ are combined or compared using a "Max" 530 function by determining, for each component, the larger of the values for the two vectors. For example, the value of $C_5$ for $V_1$ is 0.1 and the value of $C_5$ for $V_2$ is 0.1. The larger value, 0.3, is represented in the resulting combination or comparison vector 531. In this example, the combination or comparison vector, $V_{max}=V_X$, has C={0.2, 0.1, 0.3, 0.3, 0.3}. For a very large set of components that approximate a continuous function 600, 610, as shown in FIG. 8, the application of a Max function 630 to two offset and approximately normal functions 600, 610 produces a bimodal or flattened curve 631. The bimodal or flattened curve represents the combined area under the two functions.

The Min or Max functions can be applied to feature vectors or sets in feature vectors that have continuously valued components. That is, the use of such functions produces meaningful results if the strength of each component to which it is applied increases or decreases monotonically with the value of the component. Any probability distribution satisfies this criterion, such that the application of the Min or Max function produces meaningful results.

Other components may satisfy this criteria. For example, the date and time that an object was created can be included in its feature vector as a single extra component. If the value of the component is the time from some origin time, then the feature component satisfies the criterion. The combination of two such feature components with the Min function will produce the earlier creation time, whereas the combination with the Max function produces the later creation time. Also for example, the dominant image color can be included in a feature vector as a single value, for example, the sum of the color's red, green, and blue components. The minimum of two dominant colors of different intensities is a similar color with reduced intensity, which satisfies the criterion.

Most continuously valued components can be translated into a series of components for which application of a function such as Min or Max satisfies the criterion. That is, most features can be mapped to a distribution function by binning. For example, the creation time of an object can be expressed as a series of bins, such as one for each day of the year, p(day), and one for each of a number of years, p(year). If the object was created on day=10 and year=20, then p(10)=1, p(20)=1, and all other p(day) and p(year) values are zero. Similarly and for example, the potential values for a texture measure, t, can be divided into bins. If t ranges from 0 to 1, the bins can be defined, for example, as follows:

| bin | range of values of t |
| --- | --- |
| 1 | 0.0 to <0.1 |
| 2 | 0.1 to <0.3 |
| 3 | 0.3 to <0.7 |
| 4 | 0.7 to <0.9 |
| 5 | 0.9 to 1.0 |

Each bin is a component of the feature vector, T, and can take the value of 1 or 0 such that, for example, if t=0.3, then T={0, 0, 1, 0, 0}. This technique works for any feature whose value has a finite range or for any set of values. An component whose value has an infinite or very large range can be translated into a smaller finite range. For example, the number of words in a document, n, might range from 0 to millions, but can be translated as n'=log(n+1), which has a smaller and finite range.

A Min or Max function can be used to combine or compare features of different types of objects. For example, features that are not specific to the type of media can be combined and compared to objects irrespective of object type as discussed above. Features that are specific to one type of media can be translated or converted into features of another type and then combined with or compared to objects of the latter type. For example, the frequency distribution of wavelengths for an audio object can be mapped to a frequency distribution of colors by mapping audio wavelengths to color wavelengths. A proportionality constant or function can be used to convert one to the other so that, for example, the distributions have similar ranges or so that the distributions' for particular audio and image data have similar shapes. If the audio and color wavelength distributions have similar bin structure, they can be compared or combined in a meaningful way.

The function that is used to evaluate the similarity between the objects being searched and the reference, G $[W_s, g_s(M_i, R_c)]$ 134, can be tailored to complement the function that is used to combine the objects and produce the reference, as discussed previously. For example, the similarity measure can be based on the comparison function. A function such as Min $(V_1, V_2)$ or Max $(V_1, V_2)$ defines a combination vector such as $V_{min}$ or $V_{max}$, respectively. The sum or trace, Tr, of the components in a combination or comparison vector such as $V_{min}$ can be an indication of the similarity, s, between the vectors being related, $V_i$ and $V_j$. Thus, the similarity of the vectors i and j can be defined as the trace of a combination function as applied to those vectors. That is, $$s(V_i, V_j) = Trf(V_i, V_r)$$
$$= TrV_{min}$$

For example, the components of the vectors $V_1$ 500 and $V_2$ 510 each sum to unity, but the components of the vector $V_N$ 521 sum to 0.8, such that s $(V_1, V_2)$=Tr $V_N$=0.8. This measure indicates that the vectors $V_1$ and $V_2$ are 80% similar.

The function, f, is typically chosen to return a vector such that the sum of its components is between 0 and 1 inclusively, where 0 indicates no similarity and 1 indicates complete similarity, i.e. identity. In general, if a set of components in two feature vectors is standardized such that the sum of the components is unity, a vector derived by the application of the Min function will have such properties. If the objects are identical in the attributes characterized by the set of components in the feature vector, then the components of $V_{min}$ sum to unity. For example, Min $(V_1, V_1)$ is $V_1$, and the sum of the components in $V_1$ is 1, indicating that the vector $V_1$ is completely similar—i.e. identical—to itself. If the two objects are not similar in any way that is characterized by the set of components in the feature vector, then the components of $V_{min}$ sum to zero. Thus, the Min function produces vectors for which the sum of the components ranges from 0 to 1 when applied to standardized sets of components, depending upon the similarity of the objects.

If feature vectors are not standardized to sum to unity, the Min function can be adjusted to produce vectors for which the sum of the components ranges from 0 to 1 as follows:

$$s(V_i,V_j)=Tr[\text{Min}(V_i,V_j)]/\text{Min}(Tr\ V_i, Tr\ V_j)$$

This particular form is chosen in order to produce the following desirable property: A reference vector, $V_r$, that is produced by combining two vectors, $V_1$ and $V_2$, is defined as totally similar to each of $V_1$ and $V_2$. If, for example, the composite reference vector, $V_r$, is $$V_r=\text{Min}(V_1,V_2),$$

then its similarity to $V_1$ is $$s(V_r,V_1)=Tr(\text{Min}(V_r,V_1)]/\text{Min}(Tr\ V_r, Tr\ V_1).$$

which reduces to $$s(V_r,V_1)=Tr[\text{Min}(V_1,V_2)]/Tr[\text{Min}(V_1,V_2)]=1.$$

Likewise, the similarity between the composite reference vector, $V_r$, and $V_2$ is unity, $$s(V_r,V_1)=Tr[\text{Min}(V_1,V_2)]/Tr[\text{Min}(V_1,V_2)]=1.$$

This adjustment allows one, for example, to compare the vector $V_N$ 521, where C={0.2, 0.1, 0.3, 0.1, 0.1} and Tr $V_N$=0.8, with the vector $V_1$ 500, where C={0.2, 0.1, 0.3, 0.3, 0.1} and Tr $V_1$=1.0. In this case, Min $(V_N, V_1)$={0.2, 0.1, 0.3, 0.1, 0.1} and Tr [Min $(V_N, V_1)$]=0.8.

After adjustment, we have $$s(V_1,V_2)=0.8/\text{Min}[0.8,1.0]=1,$$

indicating that the combination vector, $V_N$, is completely similar to the vector $V_1$. In general, the adjustment feature has the useful property that a vector produced by application of the Min function is completely similar, after adjustment, to either of the two vectors from which it was derived. That is $$s(V_i,V_{min})=s(V_j,V_{min})=1$$

This identity also holds if the two feature vectors, $V_i$ and $V_j$, are combined with the Max function rather than the Min function. That is, $$s(V_i,V_{max})=s(V_j,V_{max})=1$$

This important property ensures that reference objects used to define the search criteria are identified as similar to the reference when they themselves, or very similar media objects, occur in the collection of objects being searched. That is, each reference item, if included in the collection of objects that is being searched, will be ranked as the most similar of the objects to the composite reference.

In comparing two feature vectors, various features or components can be emphasized or de-emphasized by weighting them more or less relative to one another. For example, the first three of the five components in the set of components, C, may be of interest whereas the last two are not. In this case, the components can be weighted so that only the first three of them are considered. This particular weighting is accomplished by multiplying the first three components of the vector by 1 and the last two components by 0. In general, the combination or comparison feature vector can be multiplied by a weighting vector, $W_s$ 50, to give, for example, $W_s$*Min $(V_i, V_j)$ or, equivalently, $W_s$*$V_{min}$.

The use of a weighting vector maintains the similarity properties discussed previously. Using a weighting vector, the similarity of two vectors, $V_i$ and $V_j$, whose components are normalized so that their weighted sum is unity, can be defined as:

$$s(V_i, V_j) = TrW_s * f(V_i, V_r)$$
$$= TrW_s * V_{min}$$

More generally and for non-standardized sets of components:

$$s(V_i,V_r)=Tr[W_s\ \text{Min}(V_i,V_r)]/\text{Min}(Tr[W_sV_i],Tr[W_sV_r]).$$

These functions maintain the useful property that a vector produced by application of the Min function is identically similar to either of the two vectors from which it was derived, as discussed previously.

The weighting vector, $W_s$ 50, 250 can be derived from information for one or more of the reference objects 121-123 by combining information about each of two or more reference objects according to a function, h $(R_i, R_j)$ 52, as discussed previously. If the information is represented as feature vectors, the weighting vector can be derived according to a function h $(R_i, R_j)$=$W_w$*$f_w$ $(V_i, V_j)$, where, for example, $f_w(V_i, V_j)$=Min $(V_i, V_j)$ or $f_w(V_i, V_j)$=Max $(V_i, V_j)$ and $W_w$ is defined, for example, according to the user's interests.

Data or parameters that cannot be binned or meaningfully compared using a function such as Min or Max can be included in a feature vector but handled differently from distribution data when combining or comparing features. For example, a feature vector, V, can include a distribution set, P={p($x_1$), p($x_2$), p($x_3$), . . . p($X_M$)}, and other data, D={$y_1$, $y_2$, $y_3$, . . . $y_N$}, such that V={P, D}. Two feature vectors, $V_1$ and $V_2$, can be combined using two functions, one that is applied to P and another that is applied to D. For example, the vectors can be combined by applying the Min function to the sets of components, $P_1$ and $P_2$, while taking the average of the components in $D_1$ and $D_2$:

$$V_r=\{\text{Min}(P_1,P_2),\{D1+D2)/2\}.$$

The resulting reference vector, $V_r$, can them be compared to the vectors of other media using two functions. For example, $$s(V_i,V_r)=s(P_i,P_r)+K*\text{abs}(D_i+D_r),$$

where K is a constant that controls the importance of the parameters in D to the similarity comparison and s($P_i$, $P_r$) is the similarity measure used for distributions, Tr [W Min($P_1$, $P_2$)]/Min (Tr W $P_1$, Tr W $P_2$). If x ranges from 0 to 1, K typically is a number between 0 and 10; for example, 1.0.

Figure 9:
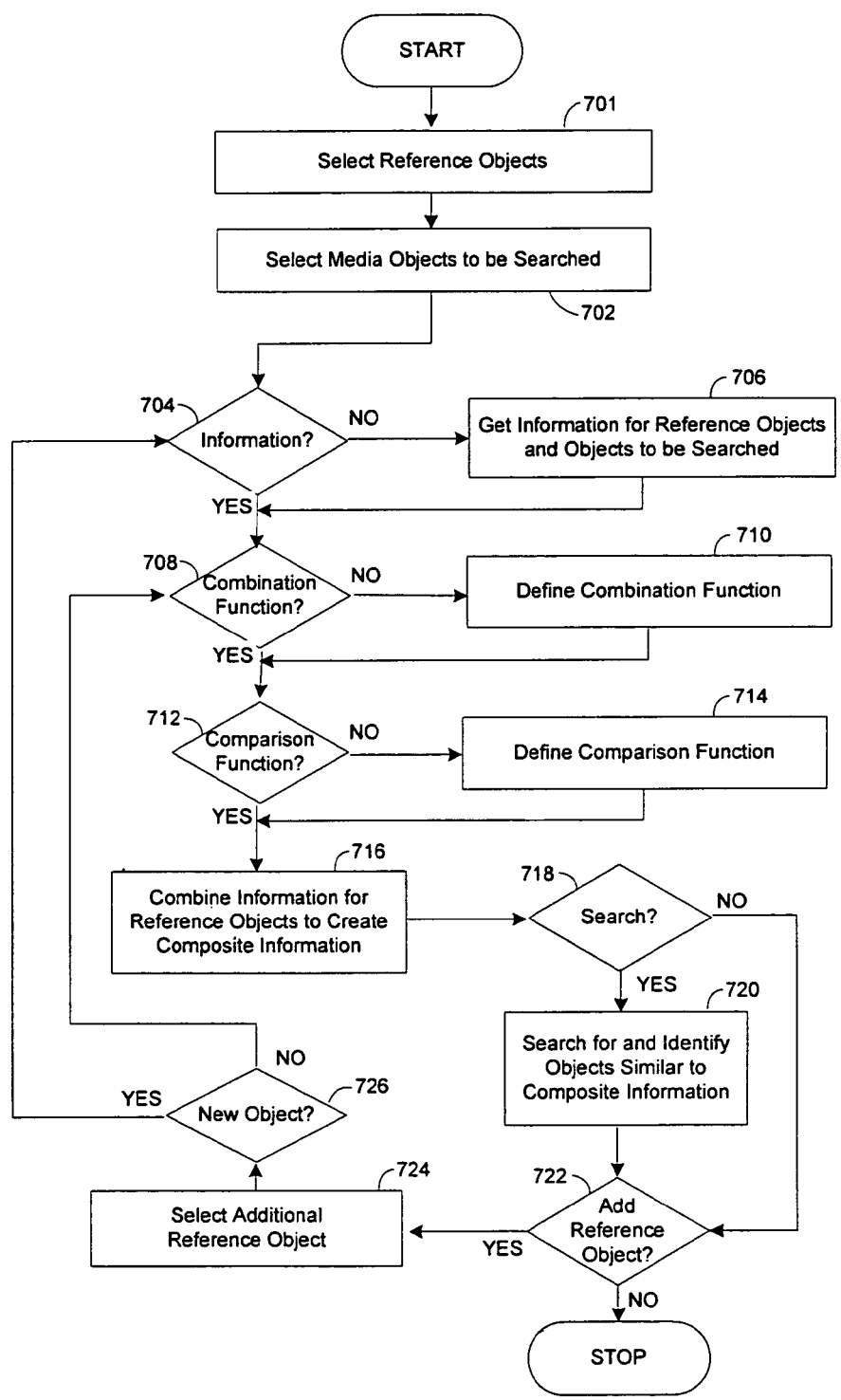
FIG. 9 describes a search method that combines information for multiple reference objects and compares it to similar information for each of several media objects.

FIG. 9 illustrates a method for searching a collection of media objects using combined information for each of two or more reference objects in a set of reference objects. A user selects (step 701) a plurality of reference objects to define the search criteria. Typically, the user desires to find media objects that are similar to the selected reference objects. The selected reference objects may have particular features or may have a general aspect that the user would like to find in other media objects. The selected reference objects may or may not share features or aspects that the user would like to find in other media objects. The user also selects (step 702) a collection of media objects to be searched. The user typically desires to find objects in the selected collection of media objects that are similar to the selected reference objects.

The method requires information (step 704) about each reference object and the media objects to be searched. Such information can be precalculated and stored so that it is available for a search (the YES branch of step 704). For example, the components for feature vectors can be defined and the feature vectors for each reference object and each of the media objects to be searched can be derived before starting a search. The feature vector for each object can be stored in association with the object.

The user can define and compute information for the reference object or the media objects to be searched (step 706) if such information is not available or if the user prefers not to use the available information (the NO branch of step 704). For example, the user can specify which sets of components and which components should be included in the feature vectors. The feature vectors for the selected reference objects and media objects can then be calculated. Typically, the information for each of the reference objects and each of the media objects to be searched will be similarly defined. For example, the feature vectors of the reference and media objects to be searched will have the same series of components. The information for the objects can be dissimilar or non-overlapping, in which case the information that is used in the search is typically limited to information that is shared among the reference objects and the media objects to be searched.

The method requires a combination function g ($R_i$, $R_j$) 32, for example, $W_c*f_c(V_i, V_j)$ 232, for combining the selected reference objects (step 708). Part or all of the combination function can be predefined so that it is available for a search (the YES branch of step 708). The user can define a combination function (step 710) if such information is not available or if the user prefers not to use the available information (the NO branch of step 708). For example, the function, $f_c$ ($V_i$, $V_j$), can be predefined while the user defines the weighting vector, $W_c$, for example, according to the relative importance of features to the search. The user also can define the function, $f_c$ ($V_i$, $V_j$), according to the intent of the search. For example, the Max function satisfies the intent of searching for the combined set of features in the reference objects, whereas the Min function satisfies the intent of searching for those features that are common to all the reference objects.

The method also requires a comparison function G [$W_s$, $g_s$ ($M_i$, $R_c$)] 34, for example, Tr [$W_s*(V_i, V_r)$] 234 (step 712). Part or all of the combination function can be predefined, or calculated according to predefined methods (the YES branch of step 712). For example, $W_s$ may be omitted or predefined to be a uniform weighting vector, such that no features are weighted more or less than any others. $W_s$ can be predefined to be the same as the weighting function, $W_c$, used to compare reference objects. Alternatively, $W_s$ can be calculated according to a function h ($R_i$, $R_j$) 52, for example, $W_w*f_w$ ($V_i$, $V_j$) 252, and the function, h ($R_i$, $R_j$), can be previously defined. For example, it can be defined to be the same as the defined combination function g ($R_i$, $R_j$) 132 or $W_c*f_c$ ($V_i$, $V_j$) 232.

The user can define $W_s$ (step 714) if it is not predefined or if the user prefers not to use the predefined $W_s$. For example, the user can specify a weighting vector, for example, by specifying a type of filter function. Alternatively, the user can define a function $f_w$ ($V_i$, $V_j$) and a vector $W_w$ as discussed previously for the definition of the combination function.

The use of different functions f ($V_i$, $V_j$) to derive the weight vector for searching, $W_s$, and the combination reference vector, $V_r$, provides the user with more control over the results of the search than when the same function is used for both purposes. For example, the user can combine features using the Max function, $f_c$ ($V_i$, $V_j$)=Max ($V_i$, $V_j$) so that $V_r=V_{max}$. Then, in comparing the reference vector to the feature vectors of the media objects, the user can weight the features according to the Min function, $f_w$ ($V_i$, $V_j$)=Max ($V_i$, $V_j$) so that $W_s=V_{min}$. In this way the user encompasses all the features in the reference objects in the search, but emphasizes those features that are shared between the reference objects when conducting the search.

As for the weighting vector, $W_s$, the function, $f_s$ ($V_i$, $V_j$), can be predefined or automatically redefined (the YES branch of step 712), or newly defined by the user (the NO branch of step 712). The function, $f_s$ ($V_i$, $V_r$), can be predefined, for example, as Min ($V_i$, $V_r$). The function $f_s$ ($V_i$, $V_r$) can be automatically redefined, for example, to be the same as the function $f_c$ ($V_i$, $V_r$) used to combined the reference objects. Alternatively, the function $f_s$ ($V_i$, $V_r$) can be newly defined by the user according to the user's search intent, as discussed previously for the definition of the combination function.

The information for the reference objects is combined (step 716) according to the defined combination function and weighting, if any, to produce composite reference information $R_c$ 30, for example, $V_r$ 230. The user can then choose whether to conduct a search (step 718) of the previously selected media objects using the composite information. If the search is conducted (the YES branch of step 718), the composite reference information is compared to the information for each of the media objects in the previously selected collection of media objects using the previously defined comparison function (step 720). For each comparison, a similarity value can be determined. The similarity values can then be used to identify media objects that are more or less similar to the composite reference information.

If a search is not conducted (the NO branch of step 718) or after the search is completed (step 720), the user can choose whether to add a reference object to the set of reference objects (step 722). If not (the NO branch of step 722), the process ends. However, the user may, for example, want to adjust the search to incorporate features or aspects of additional objects, such as objects identified in a previous search. If the user so desires (the YES branch of step 722), the user selects an additional reference object (step 724).

If the newly selected reference object is not one of the objects in the previously selected collection of media objects (the NO branch of step 726), it may be necessary to calculate the required information (step 704). If so (the YES branch of step 704), the user preferably creates or derives information for the newly selected reference object as for the previously selected reference objects. If the newly selected reference object is from the previously selected collection of media objects (the NO branch of step 726), the required information will have already been created or derived.

The user can next choose whether to newly define the combination function (step 708). For example, the user may have created an initial composite vector using the Min function, but may wish to add a third vector using the Max function. In this way, the user can incorporate unique features of the newly selected object into the existing composite information.

The user can also choose whether to newly define the comparison function (step 712). For example, the user can redefine the function, $f_s$. More typically, the user may wish to redefine the weighting vector. The comparison function can change as multiple media objects are combined in the selection process. For example, the comparison function will change if the weighting vector changes. The weighting vector will usually change with the addition of information from newly selected reference objects if it is defined as a combination of the reference vectors. In one implementation, the comparison function does not change as the information for multiple reference objects is combined—only the composite reference information changes. If this is not the case, the user may choose to maintain previously existing weighting vectors. Alternatively, the user may want to emphasize the unique features of a newly selected reference object by defining a new weighting vector.

The information for the newly selected reference object is combined with the existing composite information to create new composite information (step 716) and new weighting vectors, if necessary and desired. The method then proceeds as described previously. If a new search is conducted (the YES branch of step 718) the newly defined composite information, the new weighting vector, if any, and the newly defined comparison function, if any, are used.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential components of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results. Feature vectors or information for multiple reference objects can be combined in a single step, rather than in a series of pair wise combinations. Information for media objects and reference objects can be expressed as models or high-dimensional matrices. Non-Euclidian functions other than Min and Max can be used to combine or compare feature vectors.

Having thus described the invention, what is claimed is:

1. A computer-implemented method comprising:
receiving identification of two or more reference video objects;
calculating, by a computer, video parameters for each reference video object, wherein the video parameters characterize image features and audio features in each reference video object that are common to a first reference video object and at least a second reference video object;
combining, by the computer, the video parameters for the first reference video object and at least the second reference video object to generate composite reference information; and
comparing, by the computer, the composite reference information to video objects in a collection of video objects stored on one or more databases to identify one or more video objects in the collection having features described by the composite reference information.

2. The computer-implemented method of claim 1, wherein the image features comprise texture, color, shape, or combinations thereof, and wherein the audio features comprise Fourier transform information, wavelet decomposition information, fractal measures, or combinations thereof.

3. The computer-implemented method of claim 1, wherein the video parameters include fractal measures derived from an analysis of combined audio and visual aspects of the video object.

4. The computer-implemented method of claim 1, wherein the video parameters are combined to encompass characteristics of any of the reference video objects.

5. The computer-implemented method of claim 1, wherein the video parameters are combined to specify characteristics that are common to all of the reference video objects.

6. The computer-implemented method of claim 1, further comprising receiving identification of a new reference object after identifying one or more video objects in the collection having the features described by the composite reference information.

7. The computer-implemented method of claim 6, further comprising modifying the composite reference information based on the new reference object, wherein the new reference object is an audio object, an image object, a text object, or a video object.

8. The computer-implemented method of claim 1, wherein the calculated video parameters are combined into a feature vector for each reference video object.

9. The computer-implemented method of claim 8, wherein the feature vector includes multiple sets of image components and audio components.

10. The computer-implemented method of claim 8, wherein the feature vector is standardized to sum to unity.

11. The computer-implemented method of claim 8, wherein the feature vector is not standardized to sum to unity, and comparing comprises using a modified Min function to produce vectors for which a sum of components ranges from 0 to 1.

12. The computer-implemented method of claim 1, wherein the identification of the two or more reference video objects is received from a user computing device to identify similar video objects within the collection of video objects, and wherein the method further comprises providing the one or more identified video objects from the collection of video objects for presentation at the user computing device.

13. A system comprising:
a processor configured to execute instructions;
a non-transitory memory; and
computer program instructions embodied on the memory, which, when executed by the processor, cause the processor to:
receive identification of two or more reference video objects;
calculate video parameters for each reference video object, wherein the video parameters characterize image features and audio features in each reference video object that are common to a first reference video object and at least a second reference video object;
combine the video parameters for the first reference video object and at least the second reference video object to generate composite reference information; and
compare the composite reference information to video objects in a collection of video objects stored on one or more databases to identify one or more video objects in the collection having features described by the composite reference information.

14. The system of claim 13, wherein the audio features comprise Fourier transform information, wavelet decomposition information, fractal measures, or combinations thereof.

15. The system of claim 13, wherein the video parameters include fractal measures derived from an analysis of combined audio and visual aspects of the video object.

16. The system of claim 13, wherein the calculated video parameters are combined into a feature vector for each reference video object, and wherein the feature vector includes multiple sets of image components and audio components.

17. The system of claim 16, wherein the feature vector is standardized to sum to unity, or, if the feature vector is not standardized to sum to unity, using a modified Min function to produce vectors for which a sum of components ranges from 0 to 1.

18. The system of claim 13, wherein the identification of the two or more reference video objects is received from a user computing device to identify similar video objects within the collection of video objects, and wherein the processor is further caused to provide the one or more identified video objects from the collection of video objects for presentation at the user computing device.

19. Computer program instructions, encoded on one or more non-transitory computer-readable memories, which, when executed by a computer processor, cause the processor to:
receive identification of two or more reference video objects;
calculate video parameters for each reference video object, wherein the video parameters characterize image features and audio features in each reference video object that are common to a first reference video object and at least a second reference video object;
combine the video parameters for the first reference video object and at least the second reference video object to generate composite reference information; and
compare the composite reference information to video objects in a collection of video objects stored on one or more databases to identify one or more video objects in the collection having features described by the composite reference information.

20. The computer program instructions of claim 19, wherein the identification of the two or more reference video objects is received from a user computing device to identify similar video objects within the collection of video objects, and wherein the processor is further caused to provide the one or more identified video objects from the collection of video objects for presentation at the user computing device.

* * * * *